(12) United States Patent
Mucciardi

(10) Patent No.: US 6,496,136 B1
(45) Date of Patent: Dec. 17, 2002

(54) GROUND PENETRATING RADAR SYSTEM FOR NON-INVASIVE INSPECTION OF TREES FOR INTERNAL DECAY

(76) Inventor: Anthony N. Mucciardi, 512 Ashford Rd., Silver Spring, MD (US) 20910

(\*) Notice: Subject to any disclaimer, the term of this patent is extended or adjusted under 35 U.S.C. 154(b) by 25 days.

(21) Appl. No.: 09/609,773

(22) Filed: Jul. 3, 2000

Related U.S. Application Data

(60) Provisional application No. 60/204,393, filed on May 15, 2000.

(51) Int. Cl.[7] .............................. G01V 3/12; G01S 13/89
(52) U.S. Cl. ......................... 342/22; 342/179; 342/191
(58) Field of Search ............................ 342/22, 27, 28, 342/179, 190, 191, 195, 197

(56) References Cited

U.S. PATENT DOCUMENTS

| | | | |
|---|---|---|---|
| 3,286,400 A | 11/1966 | Gruenewaelder | 47/8 |
| 5,804,728 A | 9/1998 | Beall et al. | 73/598 |
| 5,835,053 A | 11/1998 | Davis | 342/22 |
| 5,886,662 A | 3/1999 | Johnson | 342/25 |
| 5,969,661 A | 10/1999 | Benjamin | 342/22 |
| 6,246,355 B1 * | 6/2001 | Miceli et al. | 342/22 |
| 6,347,551 B1 * | 2/2002 | Turpening et al. | 73/628 |

OTHER PUBLICATIONS

Miller, W.F. & Doolittle, J.: *Remote Sensing of Internal Characteristics in Trees and Logs using a Portable Radar Scanner*; Proceedings of 7th Symposium on Non–destructive Testing of Wood, Madison, WI, Sep. 27–29, 1989; Conference & Institutes, Washington State Univ., pp. 263–274.

Nicolotti, G. & Miglietta, P.: *Using High Technology Instruments to Assess Defects in Tress*; Journal of Arboriculture, vol. 24, No. 6, Nov. 1998, pp. 297–302.

\* cited by examiner

*Primary Examiner*—John B. Sotomayor
(74) *Attorney, Agent, or Firm*—James Creighton Wray; Meera P. Narasimhan

(57) ABSTRACT

The method for examining trees comprises directing ground penetrating radar signals into a tree using a radar apparatus connected to a microprocessor control and data acquisition unit via an interface. The tree to be examined is scanned with the radar unit after the radar velocity for that tree is calibrated. The tree is scanned at a selected elevation either by moving a single radar unit along the bark of the tree in a circumferential manner or by moving a radar signal transmitter substantially diametrically opposed to a radar signal receiver along the bark of the tree in a circumferential manner. The microprocessor control and data acquisition unit controls the radar unit and stores and digitizes radar signals for generating a real-time radargram. A cross-sectional map of the tree, a map of the severity, shape, size and location of internal decay and a map of the thickness of remaining wood are then generated from the radargram and the ensemble of saved radar signals. The maps generated from this method may then be examined by tree diagnosticians to determine the extent of the internal damage of the tree.

21 Claims, 5 Drawing Sheets

Solid Wood

Early-Moderate Decay

Moderate-Advanced Decay

Total Decay

GROUND PENETRATING RADAR SYSTEM FOR NON-INVASIVE INSPECTION OF TREES FOR INTERNAL DECAY

This application claims the benefit of U.S. Provisional Application No. 60/204,393, filed May 15, 2000.

BACKGROUND OF THE INVENTION

Trees suffering from internal decay, which reduces the amount of solid wood, are weakened structurally and are potential hazards to both property and people if they fall due to an external force, such as wind. This is especially true in urban areas. One of the key contributors to this hazardous condition is the existence and extent of internal decay. Decay can be classified into three broad categories: (1) early, in which a region of the solid wood becomes "pulpy" and "mushy", (2) moderate to advanced, in which the wood begins to separate and small pockets of air ("gaps") develop, and (3) total, in which no remaining wood exists in the decay region, only an air pocket. If decay is present, and its extent can be estimated, the amount of remaining wood can be calculated and used by tree diagnosticians, such as certified arborists, to assess the hazard posed by the distressed tree.

Since a tree is rarely circularly symmetric and internal decay is rarely at the dead center position, it is important for any inspection technique to be able to examine the tree at various circumferential location points to adequately map out the decay location and geometry. The decay pocket is more accurately described as the number of interrogation points increases, with the ultimate description deriving from a continuous or nearly continuous scan. Once a number of interrogation points have been tested, a cross-sectional view of the tree's interior is constructed and used to estimate the decay and remaining solid wood amounts.

A number of inspection techniques are commercially available that are capable of either detecting or mapping internal decay. One example of the means for detecting decay involves a procedure for using changes in the electrical impedance, or resistivity, of the tree to infer the presence of a void. Another example involves using a vertical array of accelerometers, mounted on large nails pounded into the tree, and examining the relative amplitude ratios of the accelerometer outputs after a hammer blow is applied above the topmost accelerometer position. A structurally sound tree, with no decay, is "stiffer" than one with some decay present and resonates at a different, generally higher, frequency. Those techniques rely on the concept of the weakened structure producing responses that are different from a solid structure. The advantage of those techniques is that they are non-invasive, but their disadvantage is that they are only moderately accurate for decay detection and cannot provide a cross-sectional image.

An example of an existing means to detect and map internal decay is an automated drilling device. Here, the inspector simply holds the drill against the tree at some circumferential location and depresses the trigger. A long, thin drill bit is slowly advanced into the tree by a motorized drill and a strip chart output is produced that plots the motor torque required to advance the drill as a function of the distance drilled. The chart is then examined to see if the torque decreased at some distance into the tree, which indicates an area of lesser resistance to drilling—i.e., a decay pocket—and its extent can be accurately mapped. Multiple holes must be drilled around the tree's periphery to insure that the decay is found, since it may not be at the dead center position, and to obtain a reasonable estimate of the size and shape of the decay pocket. There is a practical limit to the number of holes that one can drill, and, consequently, the cross-sectional view produced by this technique is fairly coarse. The advantage of this technique is that it is capable of producing a cross-sectional view, but its disadvantage is that the price paid for this view consists of multiple holes needing to be drilled deep into the tree's interior to obtain only a coarse cross-sectional view.

Another example of an existing means to detect and map internal decay is using a pair of low-frequency ultrasonic transducers operating at center frequencies in the range of 50 KHz to 250 KHz in a diametrically opposed transmission inspection mode. That procedure has been used successfully for inspecting utility electrical poles for internal decay. In principle, the opposing transducer pair can be moved to different points around the circumference, and an ensemble of through-transmission ultrasonic waveforms can be recorded from these locations and used to create a cross-sectional image (with special software). That technique works fairly well for utility poles primarily because utility poles have no bark, are circularly symmetric, and have small diameters (compared to trees). That technique has not worked for trees.

As indicated by its name, ground penetrating radar (GPR) systems are used quite extensively at present to make measurements of different structures in the ground. These systems are also referred to as impulse radar systems. Example applications include searching for buried utility lines in the ground, determining the location of reinforcing bars in concrete, examining for defects in roadbeds, and searching for the existence of buried structures in archaeological surveys. GPR systems incorporate a transmitter having an antenna that radiates or emits a short pulse of radio frequency electromagnetic energy, typically in the frequency range from 1 MHZ to 10,000 MHZ (10 GHz), into the subsurface medium. GPR systems, compared to other radar systems, are characterized by being able to generate a pulse length which is short with respect to the wavelength of the center frequency being transmitted. In practice, a pulse of 1 to 2 cycles of the center frequency can be emitted.

The GPR method involves the transmission of high frequency electromagnetic radio (radar) pulses into the earth and measuring the time elapsed between transmission, reflection of a buried discontinuity, and reception back at a surface radar antenna. A pulse of radar energy is generated on a dipole transmitting antenna that is placed on, or near, the ground surface. The resulting wave of electromagnetic energy propagates downward into the ground, where portions of it are reflected back to the surface when it encounters buried discontinuities. The discontinuities where reflections occur are usually created by changes in electrical properties of the sediment or soil, variations in water content, lithologic changes, or changes in bulk density at stratigraphic interfaces. Reflections can also occur at interfaces between archaeological features and their surrounding soil or sediment. Void spaces in the ground, such as may be encountered in burial tombs, tunnels, or caches, will also generate significant radar reflections due to changes in radar wave velocity between the medium (i.e., ground) and the air inside the void.

Whenever there is a change in the electrical properties in the medium, part of the pulse is reflected and part of the pulse continues to propagate into the medium. So waves or pulses are reflected by reflective interfaces defining upper and lower margins of a subsurface structure or anomaly. The reflected pulses are detected at the antenna of a receiver. The 2-way travel time, t, from emission to detection is measured and the distance of the target from the source, d, can be determined using the following equation:

$$d = (1/2) v\, t \qquad (1)$$

where v is the radar velocity in the medium and the factor ½ compensates for the two-way travel time between antenna to reflector and back to antenna.

The depth to which radar energy can penetrate and the amount of definition that can be expected in the subsurface is partially controlled by the frequency of the radar energy transmitted. The center frequency of the transmitted radar energy controls both the wavelength of the propagating wave and the amount of weakening, or attenuation, of the waves in the ground. The detection resolution of subsurface targets is a function of the pulse length and, hence, of the radio frequency (or wavelength) of the radar signal. Shorter pulse lengths (i.e., high frequencies) provide better resolution and these can be implemented by systems operating at a high center frequency. However, high frequency waves are attenuated rapidly and do not travel as far in the medium. This means the antenna operating frequency has to be chosen carefully so that the common trade-off of target resolution vs. target depth is resolved optimally. The best choice is usually to find the highest operating frequency that will permit the signal to penetrate the medium to the desired depth.

As described above, voids in the propagating medium cause significant reflections—i.e., back echoes of large amplitude—due to changes in the radar wave velocity between the medium and the air inside the void. Internal decay in a tree, as it passes from early to total decay, produces a void in the tree and, as such, creates a reflecting surface for the radio waves. These are detected by the presence of large amplitude back echoes in the single transmitter/receiver antenna reflection mode or, alternatively, by the lack of a strong through-transmission signal in the dual antenna transmission mode.

A need exists for a non-invasive inspection means that easily scans around the tree's periphery to produce a highly reliable and defined cross-sectional view mapping.

SUMMARY OF THE INVENTION

The present invention meets this need by using a GPR method to detect and map tree internal decay in a completely non-invasive manner. A ground penetrating radar (GPR) system is provided for non-invasively generating an internal cross-sectional view image of a tree for the purpose of detecting the existence of internal decay and, if present, for estimating the amount of decay and also the amount of remaining solid wood. The radar image is generated by moving a radar antenna in a circumferential direction around the tree's periphery at one or more elevational positions, while radially transmitting and receiving radar signals, or by scanning vertically in an up/down direction at one or more circumferential locations around the tree's periphery. Either one antenna is used as the transmitter/receiver in the reflection mode, or two antennas are used in the pitch-catch (transmitter+receiver) transmission mode.

In the reflection mode, radar signals are transmitted into the tree using the radar antenna, and reflected waves are received by the same antenna from internal defects such as decay. If decay (or other internal defect) is absent, no reflected waves of any appreciable amplitude are received as the radar wavefront travels from the entry point to the far surface (i.e., the tree's opposite side) and back again to the antenna to complete its two-way travel path. If decay (or other internal defect) is present, reflected signals are received at some time between the entry point, which is the reference time zero, and before the wavefront strikes the far surface. A pre-inspection calibration procedure provides an estimate of the radar signal velocity in the tree under inspection, and this is used to compute the depth of the decay, relative to the tree's periphery, at each inspection point.

In the transmission mode, radar signals are transmitted into the tree using the transmitting antenna and are received by the receiving antenna in a position approximately diametrically opposite the transmitter. If decay (or other internal defect) is absent, the received signal is only slightly modified (due to internal scattering losses in traversing the solid wood), and a strong signal is received by the receiver antenna. If decay (or other internal defect) is present, it causes some of the energy to be reflected and scattered as well as passing another portion of the wavefront through to the receiver. The received signal is modified, or extinguished in the case of a large decay pocket, including a decrease in its amplitude and a change in its velocity.

The set of radar waveforms generated during a scan are recorded digitally and displayed on the system control unit's screen as a radar image, or radargram, during the real-time data acquisition scanning phase. The waveforms are further processed off-line, using signal processing algorithms, to eliminate equipment and scanning artifacts and noise. The signal processing algorithms also enhance the target signal of interest from the decay zone so that the after-processing radargram display shows the target significantly enhanced. Measurements of decay and remaining solid wood are made from the enhanced display using additional off-line software algorithms. An inspection report of the tree's internal condition, including text and graphics, is created and may be printed either at the inspection site or afterwards.

The system's GPR data acquisition equipment is highly mobile and suitable for field use. It is dc-powered (either by a battery or an ac/dc converter), and consists of a PC-based control and data acquisition unit, housed in a hard shell briefcase container, a small external antenna control unit about the size of a book, and the radar antenna. The antenna is also about the size of a book, weighs only a few pounds, is hand-held and easily scans in either the reflection or transmission mode. Radar frequencies in the range of 500 MHZ to 1500 MHZ (0.5 GHz to 1.5 GHz) are appropriate for tree inspection.

The present invention uses ground penetrating radar (GPR) to produce a highly reliable and defined cross-sectional view mapping of a tree's internal decay when appropriately chosen antenna frequencies and post-data acquisition signal processing steps are implemented.

The present invention relates to GPR systems for use as a non-invasive means for non-destructively inspecting trees and producing an image of the internal structure of the tree for the purpose of detecting the existence of internal decay and, if present, for estimating the amount of decay and also the amount of remaining solid wood.

In accordance with the invention, a GPR system is provided for continuously and accurately determining a measure of the existence and extent of internal decay in a tree. A 2-dimensional radar image, denoted a radargram, is displayed continuously by the GPR system as a radar antenna is scanned manually along the tree in one of two ways. The "reflection" mode scan uses a single antenna that acts both as transmitter and receiver. In this scanning mode, the operator moves the antenna continuously in a 360-degree circumferential manner around the tree at a given elevation point and at a velocity of approximately 1 to 3 inches/second. The "transmission" mode scan uses two antennas with one acting as a transmitter and the other as a receiver. Two operators are required in this case so that the two antennas are held as close to diametrically opposed as possible during the scan. In this case, the antennas are scanned vertically down (or up) the axis of the tree at a given circumferential location. A series of such vertical scans are done at different circumferential locations, such as every 45 degrees, to obtain a better approximation to the true shape of the decay pocket. In general, the single antenna reflection mode is easier and for that reason is the preferred scanning procedure.

The resulting ensemble of digitized radar signals that comprise the radargram are operated on by signal processing algorithms that enhance the signal-to-noise ratio and make the reflections from the decay pocket much clearer in the radargram. The enhanced display is then operated on by additional algorithms that determine the 1-way travel time to the decay pocket, at each circumferential scan location, and convert the times to distances (i.e., depths into the tree) using the known or estimated radar wave velocity in tree under inspection. Finally, a cross-sectional view of the decay pocket is produced from the distance values and this plot can be used by certified tree diagnosticians to assess the hazard level of this tree.

The components of the GPR system for tree inspection include, but are not limited to, the following: (1) a PC-based data acquisition unit for real-time, on-line radar waveform acquisition, (2) an antenna interface unit that receives command/control signals from the data acquisition unit, pulses the radar antenna and then sends back the received radar signals to the data acquisition unit, (3) a radar antenna of a given center frequency, usually in the range of 500 MHZ to 1500 MHZ (0.5 GHz to 1.5 GHz), that acts as either transmitter, receiver, or both, (4) a power source such as a battery or an ac/dc converter, (5) signal processing software for off-line signal-noise-enhancement, (6) image reconstruction software for off-line creation of the tree's internal cross-sectional view, and (7) reporting software for producing the inspection report. Suitable GPR equipment (items (1), (2), (3)) is commercially available from sources such as Geophysical Survey Systems, Inc. (GSSI) of New Hampshire, USA.

Several steps are required to acquire digital radar signals: a velocity calibration procedure, a tree identification procedure, a circumferential landmarks procedure, a scan protocol-reflection mode procedure, and a scan protocol-transmission mode procedure.

The velocity of radar waves in the tree under examination needs to be known, at least approximately, so that the reflection times can be converted to distances. Precise values are not relevant to this invention, since the cross-sectional map provides relative distances, and these are adequate for hazard assessment. The velocity value may be used as an average of similar tree types. There are two methods for determining more precise values for the velocity, associated with each of the two data acquisition modes.

In the reflection mode, the radar waveform reflected from a small section of the tree that is free of decay, such as a branch, is recorded. The absence of decay is established by the absence of any reflections of appreciable amplitude between the near- and far-surface, i.e., within the thickness, of the tree component under interrogation. The two-way travel time (front-to-back-to-front), t, is measured along with the thickness, d, of the tree section through which the radar wave is passing. The velocity is computed from the following equation:

$$v_{wood} = d/(\tfrac{1}{2})t \qquad (2)$$

where the factor ½ converts the two-way time into a one-way time.

In the transmission mode, two waveforms are recorded by the pair of antennas in the transmit+receiver mode (i.e., pitch-catch mode). One waveform is the one-way waveform from transmitter antenna to the receiver antenna through the small tree section noted above. The second waveform is recorded by holding the two antennas in air at the same distance, d, as the tree section's thickness. The difference in arrival times, Δt, is found by subtracting the travel time in wood from that in air, and the following equation may be written:

$$\Delta t = [(d/v_{wood}) - (d/v_{air})] \qquad (3)$$

where, Δt, d, $v_{air}$ are known, and $v_{wood}$ is the unknown. Rearranging equation (3) gives:

$$v_{wood} = d/[\Delta t + (d/v_{air})] \qquad (4)$$

The next step involves a tree identification procedure. An isolated tree, or only a few trees, in an inspection zone presents no identification problem for future re-inspections. However, each tree within a cluster of trees, such as in a park area, needs to be identified uniquely so that the results of future re-inspections are matched correctly with prior inspection results. One way to identify trees is to simply attach a permanent marker to the tree, either as a nailed-on tag or a painted identification code. Preferably, global position satellite (GPS) hand-held receivers are used to provide unique earth coordinates for each tree. This technique enables identification to be made unambiguously.

Landmarks on the tree's circumference are created by marking four compass points—North (N), East (E), South (S), West (W)—with a marker using a compass. These landmarks are used as part of the data acquisition process to provide digital marks on the developing radargram display for use later in off-line analysis.

The reflection mode scan involves moving the hand-held single transmitter/receiver radar antenna circumferentially around the tree. The antenna is held against the tree and rubbed along the bark at a slow walking pace of around 1 to 3 inches/second. The GPR system is pulsing the antenna at a rate of 50,000 pulses/sec (50 KHz) and digitizing the radar waveform at a rate of 512 pulses/waveform. This means that the recording rate is 97 waveforms/second (=50,000 pulses/sec/512 pulses/waveform). The density of waveforms per inch of circumference scanned depends on the scanning rate and varies from 97 waveforms/inch for a 1 inch/second scan rate to 32 waveforms/inch for a 3 inch/second scan rate. Even at a scan rate of 3 inch/second, one waveform is being recorded every ⅓₂th of an inch, which is very dense and totally adequate for reconstructing the shape of the decay area.

The GPR data acquisition unit is initialized by pressing the start key on the data acquisition unit. The inspector then moves the antenna at the appropriate scan rate. Whenever one of the four compass locations is encountered, either the inspector or an assistant presses another key, which places a vertical line down the display screen. These marker lines are used off-line to divide the data set into the appropriate circumferential locations around the tree's periphery. An alternative way to mark scan location is to use a wheel encoder that is attached to the antenna and rubs along the bark. As the wheel turns during the scan, the encoder continuously outputs a pulse train, which is proportional to movement, to the GPR's data acquisition unit and this location mark is stored with each waveform recorded. Both marking methods are supported by commercially available equipment.

This procedure produces, with the aid of the off-line analysis software, a cross-sectional view of the decay pocket for the tree elevation point chosen, e.g., two feet above the ground. If desired, additional circumferential scans, either partial or total, may be made at different elevations to map out the vertical extent of the decay pocket.

The transmission mode scan involves holding two antennas—transmitter and receiver—in diametrically opposite positions across the tree and scanning each in synch with the other in either an upwards or downwards vertical line at the above cited scanning rate range. The downwards scan has been found to be the easier of the two. A scan length of about two feet is adequate. Radar waveforms are recorded at the same density as cited above, and a continuous display of the evolving radargram is also seen.

A number of vertical scans should be done at different locations around the circumference, usually a minimum of 4 at the four compass points, to insure that the decay is detected and to obtain a reasonable approximation of the decay geometry.

In general, the single antenna circumferential reflection scan is easier to accomplish since only one inspector and antenna are required, the scan is simpler to implement, and the entire 360-degrees of the tree's internal structure is inspected insuring a very accurate decay zone mapping.

The data file created by a scan consists of the ensemble of digitized radar waveforms recorded by the GPR's PC-based data acquisition unit. Each waveform may contain undesired signal components such as equipment artifacts and "noise," which may be signals consisting of reflections from various interfaces in the tree not associated with decay. Examples of the latter include the bark/solid wood interface, internal fissures such as cracks, and different layers of wood types. It is desirable, though not essential, to remove these signals to make the responses from the decay pocket more evident and not likely to be masked by large amplitude unrelated reflecting sources. Another purpose of this off-line signal processing step is to enhance the reflections from the decay pocket using techniques well known in the literature to enhance the signal-to-noise ratio (s/n).

One technique used in the present invention to accomplish both aims is matched filtering. The response from a known decay pocket, such as from a cut tree section with visible and measurable decay, is recorded and designated the "test" signal. The test signal is just that portion of the reflection that represents the response from only the decay area. It is a very short duration signal compared to the long waveforms recorded during the data acquisition phase that contain the signal obtained throughout the entire two-way travel path from the tree's near- to far-surface and back again. The test signal—the matched filter—is cross-correlated with each signal in the recorded ensemble and the resultant set of correlation waveforms shows large amplitudes (i.e., large correlations) wherever a reasonable replica of the test signal exists in the unknown waveform since there is a large positive (or negative) correlation at those locations. Undesired signals do not correlate well with the test signal and, hence, their correlation values are low. The s/n is significantly enhanced after this matched filtering signal processing step and makes the identity and measurement of the decay pocket much easier.

Another s/n enhancing signal processing technique used in the present invention employs "sliding window" frequency transforms. A short segment ("window") of the time waveform is selected, comparable in length to the test signal described above. The temporal length of this window is designated as t* nanoseconds (nsec) and the overall signal length as T nsec. Typically t* is on the order of 0.5–2 nsec and T is on the order of 15–20 nsec. The window of length t* is positioned at the origin (i.e., time zero) of the unknown signal, and the fast Fourier transform (FFT) of the portion of the signal contained within the window is computed. A frequency threshold of "F" MHZ is set, and the fraction of energy above F MHZ, which is the fraction of area under the frequency spectrum curve between F MHZ and the maximal frequency, is determined. The window is then advanced ("slid") one point in time, and the process repeated. The window is slid one-point-at-a-time, and the set of area fraction values is computed and stored. This procedure is repeated for all waveforms in the ensemble, and the new set of area fraction waveforms is plotted. The new display shows large amplitudes only where reflectors exist in the tree's interior that produce high frequency energy content which are associated with reflectors from decay pockets.

Both the matched filtering and sliding FFT window techniques are very effective signal processing procedures for removing undesired components from the recorded radar waveforms and enhancing the decay zone's response if it is present. Other signal processing techniques may also be employed for the purpose of s/n enhancement.

The distance to the decay zone is now determined from the enhanced radargram display. Software algorithms calculate the distance from each point on the tree's outer surface to the decay area using equation (1). Note that each such calculation is the straight line path from the antenna location to a point diametrically opposite it since the antenna is held against, and perpendicular to, the tree's bark during the scan. The time, t, in equation (1) is measured from each of the s/n-enhanced waveforms as ½ the recorded two-way travel time from time zero (i.e., launch of the radar wavefront at the bark) to the onset of a large amplitude reflector in the waveform.

Two items are required to construct a cross-sectional view map of the decay zone: (1) the shape of the tree, i.e., the diameter at different locations along its circumference, and (2) the set of distance-to-decay values at each location interrogated along its circumference. A software algorithm constructs imaginary lines ("rays") at selected points on the tree circumference and determines the thickness of the decay pocket along this line using the tree diameter plus the distance to the decay pocket from each side of the circumference along this line computed from equation (1). The total thickness of the decay pocket along this line is equal to the tree's diameter minus the distances to the decay pocket from each side of the line. This is done for as many points on the circumference as desired (controlled by a program input parameter). Preferably, a minimum of 8 points (spaced every 45-deg) are used to obtain a reasonable approximation of the decay pocket's shape.

The amount of remaining solid wood is established from the cross-sectional view map for each line generated during the construction of the map. The remaining solid wood along a given line is then determined from the two distances to the decay pocket from each side of the circumference along this line computed from equation (1). This calculation is repeated for each line used in constructing the cross-sectional view map.

A report is prepared either at the inspection site or at a later time that documents the inspection findings. The report includes: (1) pre- and post-enhancement radargrams, (2) a tree interior cross-sectional view map, (3) a table of decay and remaining wood thickness, and (4) an accompanying narrative. The report may then be presented to a certified tree diagnostician for hazard assessment.

These and further and other objects and features of the invention are apparent in the disclosure, which includes the above and ongoing written specification, with the drawings.

DETAILED DESCRIPTION OF PREFERRED EMBODIMENTS

Figure 1:
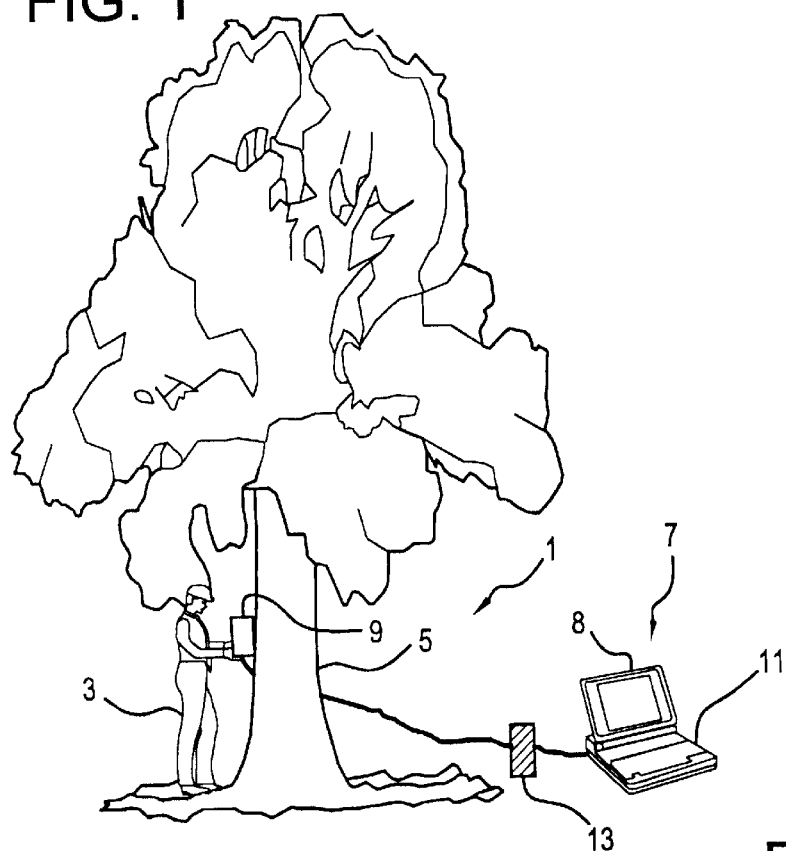
FIG. 1 shows the equipment and procedure for using the GPR system to non-invasively inspect a tree for interior decay.
Figure 9:
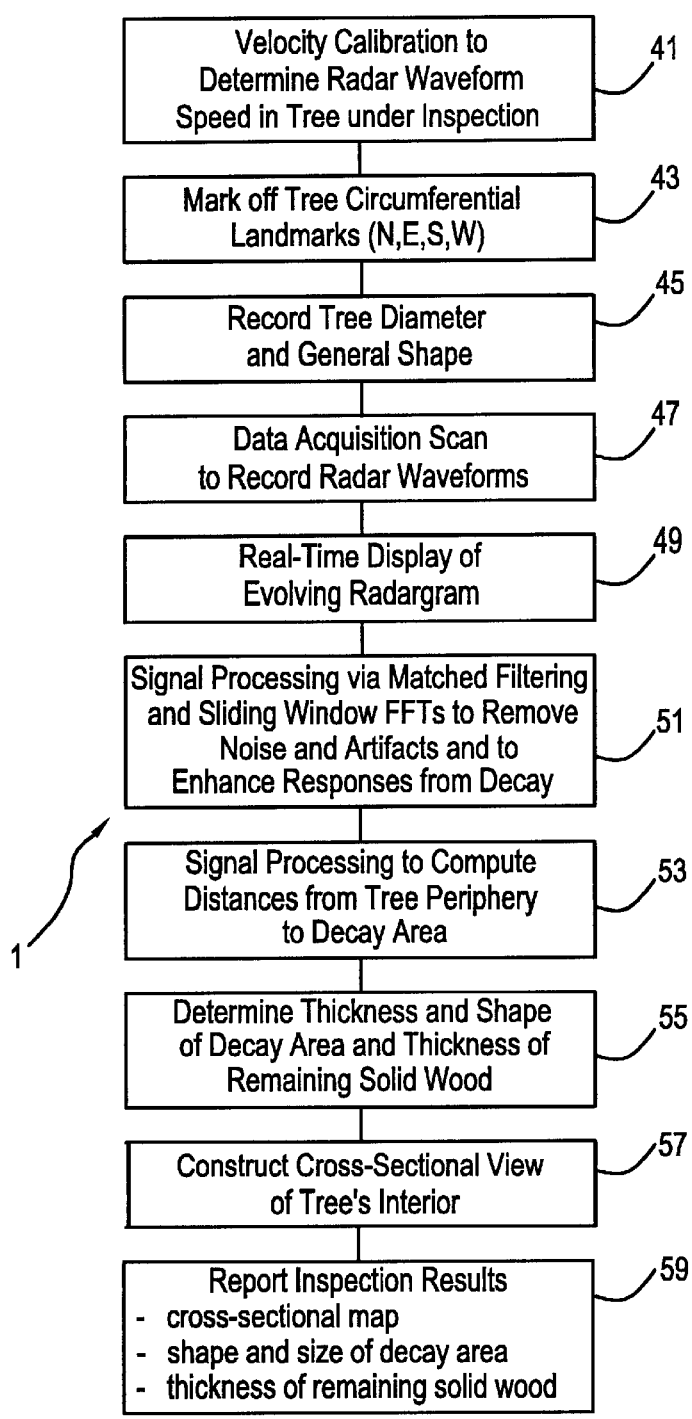
FIG. 9 is a flow chart of the entire GPR tree inspection procedure.

Referring to FIGS. 1 and 9, a ground penetrating radar (GPR) system is provided as a non-invasive, non-destructive means for determining the existence of interior decay and, if present, estimating its size and location. Furthermore, if decay is present, the amount of remaining wood is also determined.

FIG. 1 shows an inspector 3 using the GPR equipment to perform a radar scan on a tree 5 under investigation. Radar frequencies in the range of 500 MHZ to 1500 MHZ (0.5 GHz to 1.5 GHz) are appropriate for tree inspection. The PC-based data acquisition unit 7 is responsible for a number of tasks: (1) pulsing the radar antenna 9 at a rate of 50,000 pulses/second, (2) receiving the digitized radar signals at the rate of approximately 97 waveforms/second, (3) displaying the evolving radargram in real-time on its display 8, and (4) storing the ensemble of radar waveforms comprising the radargram and scan on its internal storage medium (hard drive) 11.

The interface unit 13 receives the control pulse signals from the data acquisition unit 7 and pulses the radar antenna 9. It also is receives the return radar signal, digitizes it and passes it back to the data acquisition unit 7 for display and storage.

The radar antenna unit 9 is a small (approximately 8 inches wide×6 inches high×2 inches deep), lightweight (approximately 2 pounds), hand-held unit that contains the radar antenna and may operate in either transmit, receive, or transmit/receive modes.

Figure 2A:
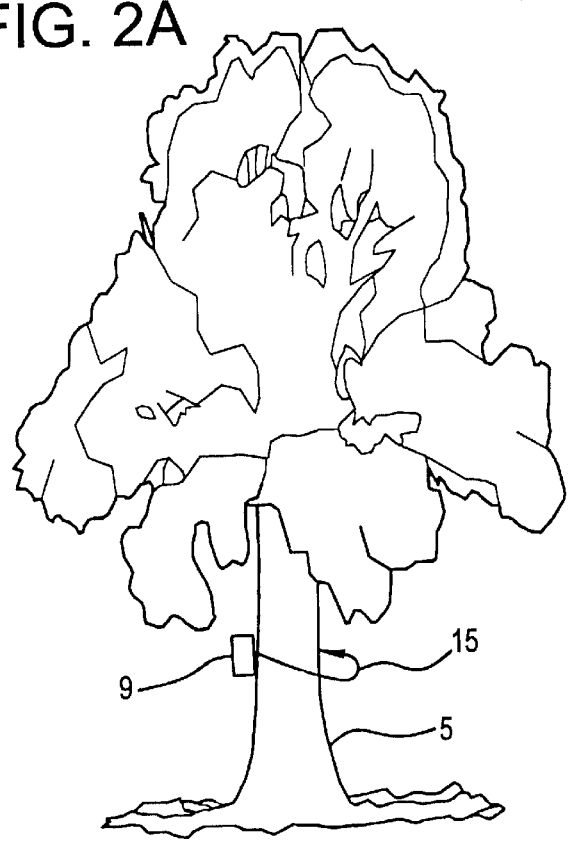
FIGS. 2A and 2B illustrate the reflection scan mode procedure for creating a 360-degree circumferential scanned radargram using a single transmit/receive radar antenna.
Figure 2B:
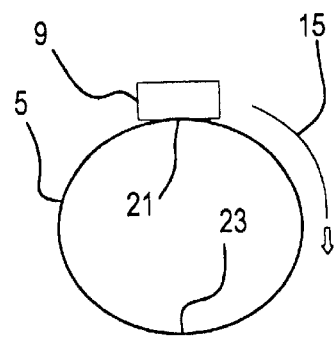

FIGS. 2A and 2B illustrate the method for implementing a circumferential reflection scan whereby the operator walks 15 slowly around the tree 5, at a rate of about 1 to 3 inches/second, while the data acquisition unit is continuously pulsing the hand-held radar antenna 9. A single antenna 9 is used in transmit/receive mode. A reflection scan is performed at a constant height (i.e., elevation) by keeping the antenna approximately parallel to the ground as the scan progresses.

In a preferred embodiment, a first solid copper bow-tie transmitting dipole antenna and a second solid copper bow-tie receiving dipole antenna are packaged within a single unit 9.

Figure 3A:
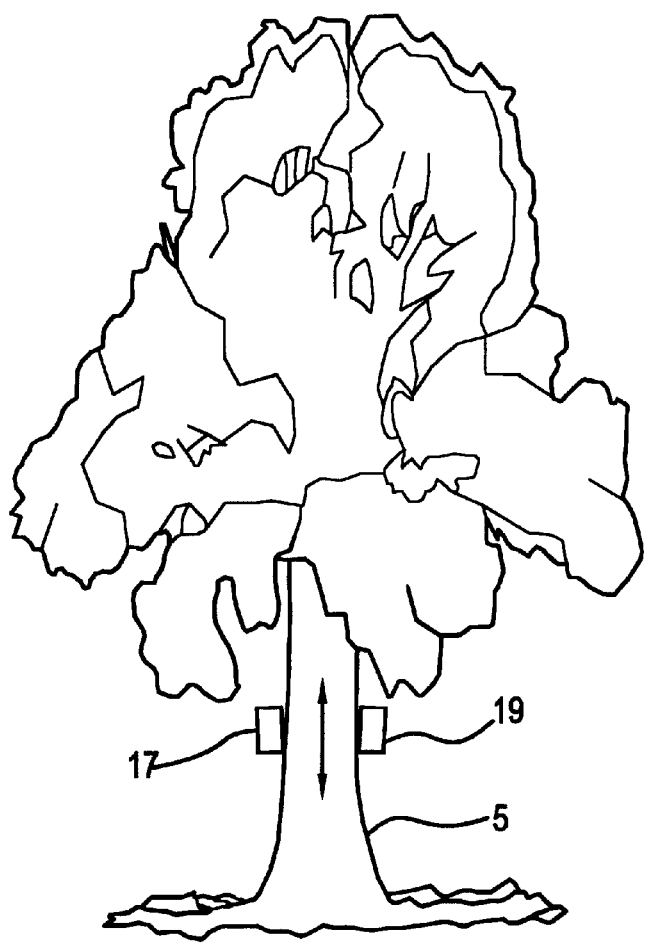
FIGS. 3A and 3B present the transmission scan mode procedure for creating a vertically scanned radargram using dual transmit and receive radar antennas.
Figure 3B:
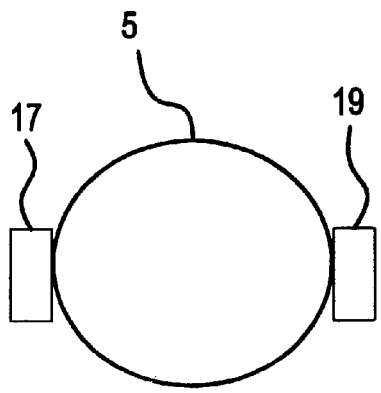

FIGS. 3A and 3B illustrate the method for implementing a vertical transmission scan whereby two operators are positioned approximately diametrically opposite one another, each with a radar antenna 17 and 19. Their respective antennas are positioned such that they are at the same elevation and are scanned either downwards or upwards at the same rate of about 1 to 3 inches/second so as to maintain them as close to diametrically opposed throughout the scan as possible. Alternatively, one operator may move a frame which supports diametrically opposite transmitter and receiver antennas.

Figure 4A:
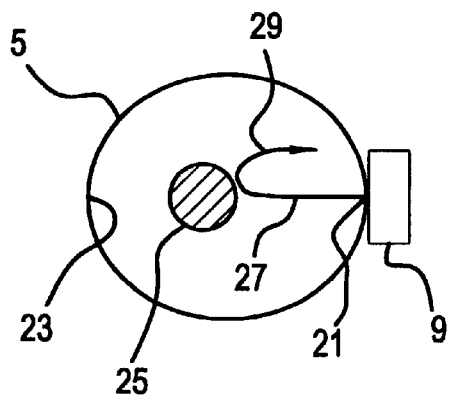
FIGS. 4A and 4B show the radar wavefront path in both the reflection and transmission mode scans.
Figure 10A:
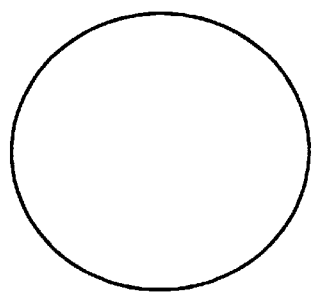
FIGS. 10A–10D are schematics of tree sections showing whether decay has been detected and, if so, a guide as to its severity, location and shape.
Figure 10B:
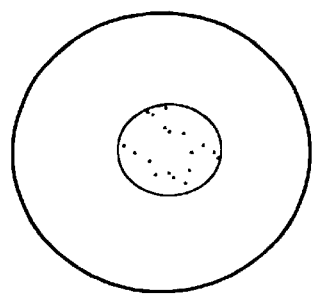
Figure 10C:
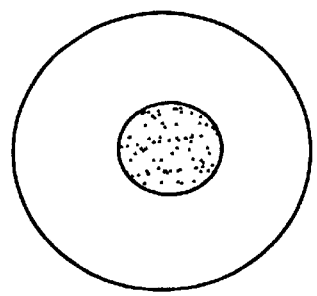
Figure 10D:
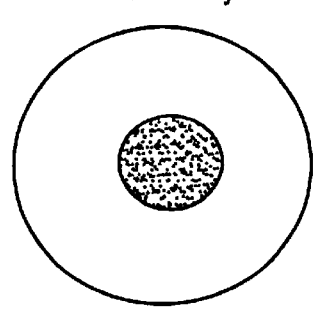

The reflection scan mode uses a single transmit/receive antenna and launches a radar wavefront 27 at the point of entry 21 of the tree bark touching the antenna. If no decay is present, the wavefront 27 travels relatively unimpeded to the far surface 23, reflects from the wood/air interface, and returns to the antenna 9. The received signal reflected from the far surface 23 is low in amplitude, because it has made two trips through the tree's interior and the solid wood disperses (i.e., attenuates) the wavefront. If decay is present, as shown in FIG. 4A, the radar wavefront 27 is reflected 29 from the decay pocket 25 and arrives back to the transmitting antenna 9 at a time earlier than the 2-way travel time through the tree 5 (determined from Equation (1) by solving for "t"). The amplitude of the reflected wave 29 is proportional to the decay area 25 and type. Larger decay area and more advanced decay (approaching "total" as illustrated in FIG. 10D) produces larger amplitudes of the reflected signal.

Figure 4B:
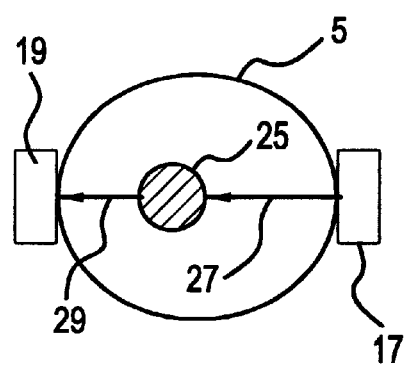

The transmission scan mode uses dual antennas for the separate transmit 17 and receive 19 functions, as shown in FIG. 4B. If no decay is present, the received signal 29 has a large amplitude since it suffers from only the solid wood dispersive effects that are small compared to an intervening decay pocket. Additionally, the signal arrives at the receiver 19 at a time "t" determined from Equation (1) without the factor of ½. If decay 25 is present, the received signal 29 has a smaller amplitude, again proportional to the decay area and type, and arrives at a later time due to the necessity of passing through and around the decay pocket 25.

Figure 5A:
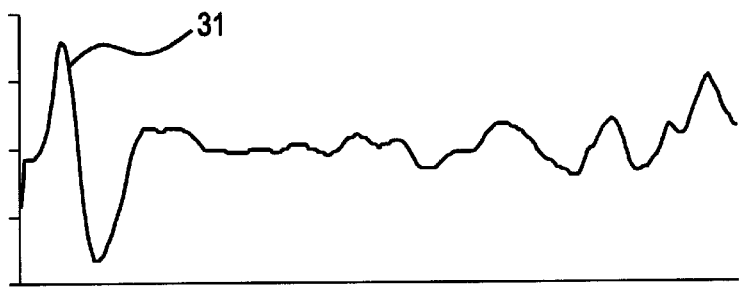
FIGS. 5A and 5B present reflection mode radar waveforms recorded from a tree with no decay (upper) and one with decay (lower).
Figure 5B:

The radar waveforms associated with the single antenna 9 reflection scan mode are shown in FIGS. 5A and 5B for the cases of a tree with no decay, FIG. 5A, and a tree with decay, FIG. 5B. The units on each plot are time (i.e., nanoseconds) along the horizontal axis and amplitude (i.e., millivolts) along the vertical axis. Only that portion of the waveform between the entry point 31 at the bark/solid wood interface and ⅔ of the distance through the tree's interior is shown. As shown in FIG. 5A, no appreciable reflection exists. As shown in FIG. 5B, a strong reflection 33 from the decay area is present in the trace. The signal 31 at the entry point which is designated bark-wood interface in FIGS. 5A and 5B may be an artifact from the equipment such as a direct or scattered signal from a transmitter bow tie within a unit 9.

Figure 6A:
FIGS. 6A and 6B present transmission mode radar waveforms recorded from a tree with no decay (upper) and decay (lower).
Figure 6B:

The radar waveforms associated with the dual antenna transmission scan mode are shown in FIGS. 6A and 6B for the cases of a tree with no decay (FIG. 6A) and a tree with decay (FIG. 6B). The same units apply as in FIGS. 5A and 5B. In this case, the signal associated with the 1-way travel path from transmitter to receiver across the tree's interior is given. The trace of FIG. 6A, for a tree with no decay, shows a strong (i.e., large amplitude) received signal 35 since there was no intervening decay pocket and the dispersion was due only to small interior defects in the solid wood. The trace of FIG. 6B, for a tree with decay, shows a weak (i.e., small amplitude) received signal 37 since the intervening decay pocket caused the signal to mainly be reflected back to the transmitting antenna and only a small portion to be transmitted through to the receiver antenna.

Figure 7A:
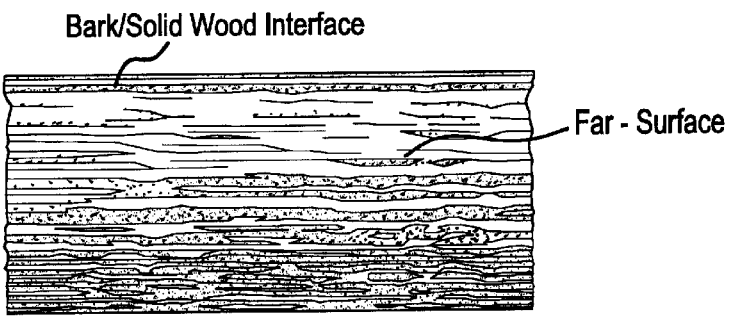
FIGS. 7A and 7B show radargrams for a 360-degree reflection mode scan for a tree with no decay (upper) and a tree with decay (lower).
Figure 7B:
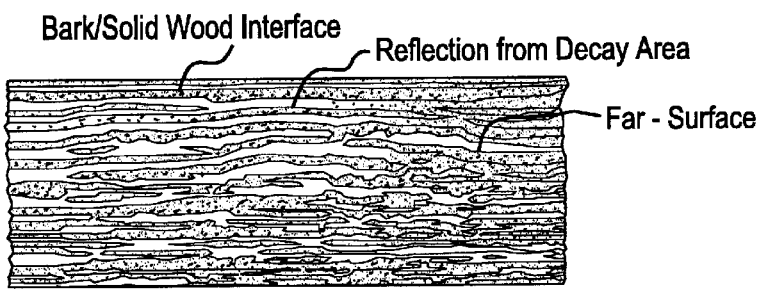

The reflection scan mode radargrams for two trees with no decay and decay are given, respectively, in the traces of FIGS. 7A and 7B. The radargram plots each radar waveform stacked side-by-side in a horizontal manner. Position along the tree's circumference is given in the horizontal direction from left (0 degree starting point) to right (360 degree ending point). Time (2-way) is presented in the vertical direction with time zero, i.e., signal launch, at the top with time progressing in the downward direction. A gray-scale color code is used in which positive waveform values are light and negative waveform values are dark. This means that a large positive peak is coded pure white and a large negative peak is coded pure black. Smaller valued positive peaks are less white, and smaller valued negative peaks are less black.

A moderate amplitude reflection is received by the transmitting antenna when the radar wavefront encounters the bark/solid wood interface. This occurs at approximately the same time for each waveform (depending on the bark's thickness as the antenna is moved around the tree's periphery) and appears as a horizontal white/black band near the top of both radargrams. If no decay is present, the next signal encountered will be the return reflection from the far-surface as shown in FIG. 7A. The alternating gray levels between the two marked portions of the upper trace are small reflections from internal tree anomalies.

The trace of FIG. 7B shows the horizontal white/black band associated with the entry point bark/solid wood interface. It also shows a strong reflection occurring between the front and far surfaces, which is due to a decay pocket. FIG. 7B shows that the white/black band associated with the decay pocket is not horizontal, which is the case for a symmetrical decay pocket located at the centroid of the tree. Instead, the band rises to a maximum at the center of the radargram, which is the S (south) position, and falls on either side. This means that the decay pocket is located off-center and, in fact, is closer to the S marker than anywhere else. The distances to the decay area from each circumferential position are determined from this ensemble of data by finding the 1-way travel time from the bark/solid wood interface to the decay response and then using Equation (1) to compute the distance.

Figure 8A:
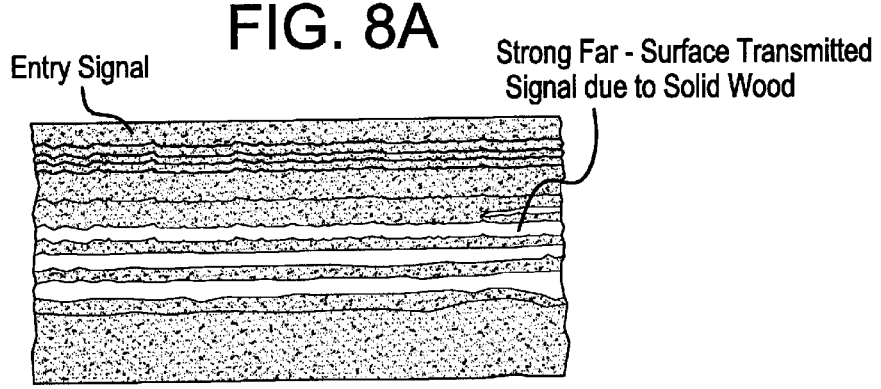
FIGS. 8A and 8B show radargrams for a vertical transmission mode scan at one circumferential position for a tree with no decay (upper) and a tree with decay (lower).
Figure 8B:
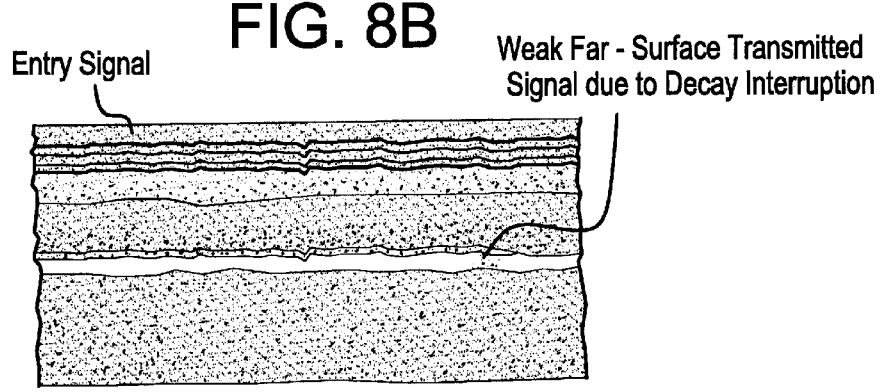

The transmission scan mode radargrams for two trees with no decay and decay are given, respectively, in the traces of FIGS. 8A and 8B. The only difference between the radargrams of FIGS. 7A, 7B, 8A and 8B is that the dual-antenna, transmit/receive scan mode was used in FIGS. 8A and 8B to acquire the radar waveform ensemble. The data shown in both plots of FIGS. 8A and 8B were recorded from trees without decay (FIG. 8A) and with decay (FIG. 8B), and the two antennas were scanned in an approximate 2 foot length downwards direction from approximately the 4 foot to 2 foot elevations above the ground. The transmitter antenna was placed at the E (east) location and the receiver antenna was placed diametrically opposed at the W (west) location.

No entry point bark/interface signal is present in the transmission scan mode since this signal is reflected back to the transmitter and not seen by the receiver. The trace in FIG. 8A shows a strong received signal, which represents the straight-through signal unimpeded by any intervening decay pocket. The trace in FIG. 8B shows a much weaker received signal that has had its amplitude lowered mainly due a strong reflection back to the transmitter from the decay zone with only a small portion of the signal traveling through and around the decay zone.

The steps comprising the overall procedure for using a GPR system to detect, locate, and size a decay area, as well as to determine the amount of remaining solid wood, are given in FIG. 9. Velocity calibration is the initial step 41 and is done according to equations (1)–(4) depending on the type of scan about to be employed. The next step 43 consists of marking the circumferential locations (N,E,S,W) around the tree's periphery using a compass and/or GPS receiver as a guide. During the next step 45, the tree's diameter is recorded, at least in the four marked locations, along with its general shape (e.g., circular, ovular, kidney bean, etc.). The data acquisition unit, 7 of FIG. 1, is initialized by entering calibration constants and the data file name. Once this is done, the inspector(s) position the antenna(s) at the appropriate position and begins either a reflection or transmission mode scan 47. A real-time display of the evolving radargram 49, shown in FIGS. 7A, 7B, 8A and 8B, is shown on the data acquisition unit's display, 8 of FIG. 1, as the scan proceeds. Upon completion of the scan, the named data file containing the ensemble of radar waveforms (comprising the displayed radargram) is closed and stored permanently in the data acquisition unit's hard drive, 11 of FIG. 1.

The data file(s) for the inspection are transferred to another computer for post-inspection, off-line processing after the data acquisition phase is completed. As shown in FIG. 9, signal processing algorithms consisting of matched filtering and/or sliding window FFTs are employed 51 to remove noise and other artifacts and to enhance the signal/noise ratio emanating from the decay zone, if present. The enhanced waveforms are then examined by other signal processing routines to determine 53 the distances from the tree's periphery to the decay area (using equation (1)) at several interrogation points around the circumference. Preferably, a minimum of eight such points are used to produce 55 a reasonable approximation of the decay zone's area, location and shape.

Next a cross-sectional view map is constructed 57 showing the tree's interior at the elevation point inspected and also showing the location, shape and size of the decay pocket if it exists.

Finally, a report is generated 59 that presents the main results of the GPR tree inspection: (1) cross-sectional map, (2) shape, location and size of the decay area (if present), and (3) thickness of the remaining solid wood. A schematic of the cross-sectional view tree section showing whether decay has been detected and, if so, a guide as to its severity, location and shape, is shown in FIGS. 10A–10D. FIG. 10A shows a cross-section of a tree with no decay. FIG. 10B shows a tree in an early to moderate decay stage, in which a region of the solid wood has become "pulpy" and "mushy." FIG. 10C shows a tree in a moderate to advanced decay stage in which the wood has begun to separate and develop small pockets of air ("gaps"). FIG. 10D shows a tree in a total decay stage in which no remaining wood exists in the decay region, only an air pocket.

A new procedure is described for using a mobile ground penetrating radar (GPR) system to non-invasively generate an internal cross-sectional view image of a tree for the purpose of detecting the existence of internal decay and, if present, for estimating the amount of decay and also the amount of remaining solid wood. The GPR system equipment includes: (1) a PC-based data acquisition unit for real-time, on-line radar waveform acquisition, (2) an antenna interface unit that receives command/control signals from the data acquisition unit, pulses the radar antenna and then sends back the received radar signals to the data acquisition unit, (3) a radar antenna of a given center frequency, usually in the range of 500 MHZ to 1500 MHZ (0.5 GHz to 1.5 GHz), that acts as either transmitter, receiver, or both, (4) a power source such as a battery or ac/dc converter, (5) signal processing software for off-line signal-noise-enhancement, (6) image reconstruction software for off-line creation of the tree's internal cross-sectional view, and (7) reporting software for producing the inspection report.

A new procedure of the invention allows uniquely identified trees to be inspected or re-inspected using global positioning satellite receivers.

The present invention also provides a procedure for using the GPR system in the single antenna reflection mode to perform a partial or total 360-degree circumferential scan, at a given tree elevation, to generate a real-time radargram display and to digitize and save the associated ensemble of radar waveforms for off-line data analysis.

A new procedure for using the GPR system in the dual antenna transmission mode to perform a vertical scan, at a given tree circumferential location, to generate a real-time radargram display, and to digitize and save the associated ensemble of radar waveforms for off-line data analysis.

A new procedure of the invention allows estimating the radar velocity in trees for both the reflection and transmission scanning modes.

The invention includes a procedure for enhancing the individual waveforms comprising the 2-D radargram and, hence, the radargram itself by removing equipment and noise artifacts plus signals from internal reflectors other than decay, and improving the decay response signal/noise ratio using matched filter cross-correlation signal processing techniques.

A new procedure enhances the individual waveforms comprising the 2-D radargram and, hence, the radargram itself by removing equipment and noise artifacts plus signals from internal reflectors other than decay, and improving the decay response signal/noise ratio using sliding window fast Fourier transform (FFT) signal processing techniques.

The present invention also provides a procedure for measuring the location, size and shape of the interior decay area, as well as a procedure for constructing a cross-sectional view map of the decay area. The new procedure may then be used for computing the decay pocket's total thickness and shape from the cross-sectional view map, as well as for determining the amount of remaining solid wood.

The invention also provides procedures for preparing reports that present the main results of the GPR tree inspection: (1) cross-sectional map, (2) shape, location and size of the decay area (if present), (3) thickness of the remaining solid wood, and (4) a schematic of the cross-sectional view tree section showing whether decay has been detected and, if so, a guide as to its severity, location and shape. This report may be presented either at the inspection site or at a later time.

While the invention is intended for use mainly on living trees, the invention may be used to assay the structural integrity of posts, poles, utility poles, fences and wooden support structures such as used in buildings, bridges, entertainment structures and stadiums.

While the invention has been described with reference to specific embodiments, modifications and variations of the invention may be constructed without departing from the scope of the invention.

I claim:

1. A method of examining trees for internal decay comprising directing ground penetrating radar signals into a tree, receiving radar signals from the tree, scanning the tree with the directing and the receiving of radar signals and generating a real-time radargram, and digitizing and saving a resulting ensemble of radar waveforms for offline data analysis and generating diagrams derived from the radargram.

2. The method of claim 1, wherein the diagrams are selected from a group consisting of a cross-sectional map of a tree, a map of shape, location and size of decay, a map of thickness of remaining solid wood, a guide to severity, shape, and location of decay, and combinations thereof.

3. The method of claim 1, wherein scanning comprises moving a radar apparatus along bark of a tree in a circumferential manner at a selected elevation along the tree.

4. The method of claim 3, further comprising initially marking the tree at points selected from a group of points facing north, south, east, west, points between, and combinations thereof.

5. The method of claim 4, further comprising noting circumferential location along the tree using the selected points.

6. The method of claim 3, further comprising using a wheel encoder to note circumferential location along the tree.

7. The method of claim 3, wherein moving the radar apparatus comprises moving a single unit which functions as a transmitter and receiver of radar frequency signals.

8. A method for estimating radar velocity in a tree comprising:
   a) applying a ground penetrating radar frequency transmitter diametrically opposite a ground penetrating radar frequency receiver to a decay-free section of a tree, transmitting a radar frequency signal from the transmitter to the receiver, and noting the time necessary for the radar frequency signal to pass from the transmitter to the receiver through the decay-free section of the tree,
   b) holding the ground penetrating radar frequency transmitter diametrically opposed to the radar frequency receiver at the same distance as the thickness of the decay-free section of the tree in step a), transmitting a radar frequency signal from the transmitter to the receiver, noting the time necessary for a radar frequency signal to pass from the transmitter to the receiver through air, and
   c) comparing the times noted in steps a) and b).

9. The method of claim 8, further comprising enhancing signal-to-noise ratio of the radargram comprising using a matched filtering process.

10. The method of claim 9, wherein the using a matched filtering process comprises measuring radar response from a known decay pocket of a tree and cross-correlating the radar response from the known decay pocket with each signal in the ensemble of signals generated while examining a tree.

11. The method of claim 9, further comprising using sliding window frequency transforms by:
   a) selecting a short segment of a time waveform,
   b) positioning the short segment at the origin of a waveform,
   c) computing Fast Fourier Transformations of the portion of the waveform contained within the short segment,
   d) sliding the short segment to another point on the waveform,
   e) repeating the process for all segments on the waveform, and
   f) repeating the process for all waveforms in the radargram.

12. An apparatus for detecting internal decay of a tree comprising a ground penetrating radar frequency transmitter for transmitting radar frequency input signals into a tree and a radar frequency receiver for receiving radar frequency output signals from the tree, a microprocessor controller and data acquisition unit for displaying a real-time display of a radargram and digitizing and saving an ensemble of radar waveforms for offline data analysis, an interface connected to the microprocessor, the transmitter, and the receiver for receiving control signals from a microprocessor controller and data acquisition unit, pulsing the radar frequency transmitter for providing radar input signals, and sending radar output signals to the microprocessor data acquisition unit and generating diagrams of solid wood remaining.

13. The apparatus of claim 12, further comprising a wheel encoder for marking circumferential location along a tree connected to the radar frequency receiver.

14. The apparatus of claim 12, wherein the transmitter and the receiver are mounted in a radar unit.

15. The apparatus of claim 14, wherein the radar unit comprises a single transmitter/receiver.

16. The method of determining viability of a tree comprising directing pulses of radar energy signals from a radar unit into a tree over a circumferential scan, while in contact with the tree at a center frequency of from above 500 MHz to about 1500 MHz, receiving the pulsed radar energy signals at the radar frequency at a time displaced from the directing of the pulses, using an encoder attached to the radar unit in contact with the tree for triggering automatic data acquisition at each increment, digitizing the radar energy signals, enhancing the received signals by noise reduction, determining time differentiations between the directing and receiving of signals, and presenting a radargram showing limitations of decay pockets in the tree.

17. The method claim 16, further comprising determining cross-section of sound wood at a cross-section of the tree, comparing the cross-section of sound wood to the cross-section of the tree, and determining viability of the tree.

18. The method of claim 17, further comprising determining the cross sections at multiple elevations and creating multiple cross-section maps showing sound wood at the multiple elevations.

19. The method of claim 16, wherein the circumferential scan comprises a 360° scan, and wherein the increments comprise fine increments of about one-quarter inch spacing.

20. The method of determining viability of a tree comprising directing pulses of radar energy signals from a radar unit into a tree over a circumferential scan, while in contact with the tree at a center frequency of from above 500 MHz to about 1500 MHz, receiving the pulsed radar energy signals at the radar frequency at a time displaced from the directing of the pulses, digitizing the radar energy signals, enhancing the received signals by noise reduction, determining time differentiations between the directing and receiving of signals, and presenting a radar gram showing limitations of decay pockets in the tree.

21. The method of determining viability of a tree comprising directing pulses of radar energy signals from a radar unit into a tree over a circumferential scan, while in contact with the tree at a center frequency of from above 500 MHz to about 1500 MHz, receiving the pulsed radar energy signals at the radar frequency at a time displaced from the directing of the pulses, using an encoder attached to the radar unit in contact with the tree for triggering automatic data acquisition at each increment, digitizing the radar energy signals, determining time differentiations between the directing and receiving of signals, and presenting a radar gram showing limitations of decay pockets in the tree.

* * * * *